(12) United States Patent
Ike

(10) Patent No.: US 11,360,457 B2
(45) Date of Patent: Jun. 14, 2022

(54) SYSTEM AND METHOD FOR REPORTING MANUFACTURING PROGRESS

(71) Applicant: Tokyo Factory, Inc., Tokyo (JP)

(72) Inventor: Minoru Ike, Tokyo (JP)

(73) Assignee: Tokyo Factory, Inc., Tokyo (JP)

( * ) Notice: Subject to any disclaimer, the term of this patent is extended or adjusted under 35 U.S.C. 154(b) by 0 days.

(21) Appl. No.: 17/665,963

(22) Filed: Feb. 7, 2022

(65) Prior Publication Data

US 2022/0155753 A1  May 19, 2022

Related U.S. Application Data

(63) Continuation of application No. PCT/JP2021/024416, filed on Jun. 28, 2021.

(30) Foreign Application Priority Data

Jul. 3, 2020 (JP) .............................. JP2020-115414

(51) Int. Cl.
  *G05B 19/4155* (2006.01)
  *G05B 19/4097* (2006.01)

(52) U.S. Cl.
  CPC ..... *G05B 19/4097* (2013.01); *G05B 19/4155* (2013.01); *G05B 2219/49004* (2013.01)

(58) Field of Classification Search
  None
  See application file for complete search history.

(56) References Cited

U.S. PATENT DOCUMENTS

| | | | |
|---|---|---|---|
| 2011/0208556 A1* | 8/2011 | Nagahara | G06Q 10/06 705/7.14 |
| 2017/0269578 A1* | 9/2017 | Jin | G05B 19/409 |
| 2017/0286890 A1 | 10/2017 | Fuessel, Jr. | |
| 2020/0151633 A1* | 5/2020 | Suginishi | G06Q 10/06315 |

(Continued)

FOREIGN PATENT DOCUMENTS

| | | |
|---|---|---|
| JP | H08-185447 A | 7/1996 |
| JP | 2002-24330 A | 1/2002 |
| JP | 2002-297954 A | 10/2002 |

(Continued)

OTHER PUBLICATIONS

International Search Report dated Sep. 14, 2021 in corresponding International Patent application No. PCT/JP2021/024416; 6 pages with English Translation.

(Continued)

*Primary Examiner* — Ryan A Jarrett
(74) *Attorney, Agent, or Firm* — Maier & Maier, PLLC

(57) ABSTRACT

A program for causing a processor of a computer to execute: a step of receiving an input of first information indicating a name of a component of a finished product to be manufactured at a manufacturing site; a step of receiving an input of second information indicating a name of a manufacturing process for the component; a step of receiving an input of image information captured by photographing or filming a state of the manufacturing process; a step of associating the image information with the first information and the second information; and a step of presenting the image information together with the first information and the second information to a user.

12 Claims, 12 Drawing Sheets

(56) References Cited

U.S. PATENT DOCUMENTS

2022/0091587 A1* 3/2022 Hatano ............... G06Q 50/04

FOREIGN PATENT DOCUMENTS

| | | |
|---|---|---|
| JP | 2003-303219 A | 10/2003 |
| JP | 2007-164446 A | 6/2007 |
| JP | 2011-227811 A | 11/2011 |
| JP | 2013-250713 A | 12/2013 |
| JP | 2015-212916 A | 11/2015 |
| JP | 2019-16226 A | 1/2019 |
| WO | 2013/035687 A | 3/2013 |

OTHER PUBLICATIONS

Japanese Office Action dated Feb. 12, 2021 in corresponding Patent application No. 2020-115414; 8 pages.
Japanese Decision to Grant a Patent dated Jun. 22, 2021 in corresponding Patent application No. 2020-115414; 5 pages.

\* cited by examiner

| Component Name (First Information) | Process Name (Second Information) | Material Arrival | Component Cutting | Assembly | Welding (1) | Welding (2) | Inspection | Material Arrival | Component Cutting | Material Arrival | Component Cutting | ... | ... | ... |
|---|---|---|---|---|---|---|---|---|---|---|---|---|---|---|
| Component 1 | | | | | | | | | | | | | | |
| Component 2 | | | | | | | | | | | | | | |
| Component 3 | | | | | | | | | | | | | | |
| ... | | | | | | | | | | | | | | |

FIG. 3

| Image Information | | | Component Name (First Information) | Process Name (Second Information) | Comment information | ID of a person who photographed or filmed |
|---|---|---|---|---|---|---|
| File Name | Photographing/Filming Date | Data Size | | | | |
| aaa.jpg | yy/mm/dd | aa.kb | Component 1 | Material Arrival | : | : |
| bbb.jpg | yy/mm/dd | bb.kb | Component 1 | Material Arrival | : | : |
| ccc.jpg | yy/mm/dd | cc.kb | Component 1 | Material Arrival | : | : |
| ddd.jpg | yy/mm/dd | dd.kb | Component 1 | Material Arrival | : | : |
| eee.jpg | yy/mm/dd | ee.kb | Component 1 | Material Arrival | : | : |
| ... | ... | ... | ... | ... | ... | ... |
| fff.jpg | yy/mm/dd | ff.kb | Component 1 | Member Cutting | : | : |
| ggg.jpg | yy/mm/dd | gg.kb | Component 1 | Member Cutting | : | : |
| hhh.jpg | yy/mm/dd | hh.kb | Component 1 | Member Cutting | : | : |
| iii.jpg | yy/mm/dd | ii.kb | Component 1 | Member Cutting | : | : |
| ggg.jpg | yy/mm/dd | gg.kb | Component 1 | Member Cutting | : | : |
| ooo.jpg | yy/mm/dd | oo.kb | ... | ... | ... | ... |
| ... | ... | ... | | | | |

Create new

Construction Name (Required): Repair work on a waste incineration boiler

Construction Number (Required): 620001

Customer Name: OOOOO Co. Ltd.

Email Address of Construction Viewer (Required):
- aaaaaaaaaa@co.jp
- bbbbbbbbbbb@co.jp Member Name 1
- Component 1
- Process 1: Material Arrival
- Process 2: Member Cutting
- Process 3: Assembly
- Process 4: Welding (1)
- Process 5: Welding (2)
- Process 6:

Member Name 2
- Component 2
- Process 1: Material Arrival

Input Time Information

Confirm

SYSTEM AND METHOD FOR REPORTING MANUFACTURING PROGRESS

CROSS-REFERENCE TO RELATED APPLICATIONS

This application is a Continuation Application of No. PCT/JP2021/024416, filed on Jun. 28, 2021, and the PCT application is based upon and claims the benefit of priority from Japanese Patent Application No. 2020-115414, filed on Jul. 3, 2020, the entire contents of which are incorporated herein by reference.

FIELD

The present disclosure relates to programs, methods, and systems.

BACKGROUND

It has been common for a person in charge of management to visit a manufacturing site and directly check on progress at the manufacturing site.

Jpn. Pat. Appln. KOKAI Publication No. 2007-164446 discloses a system in which a worker operates a hand-held terminal to read manufacturing instructions or bar codes on component shelves to manage the components.

However, when the manufacturing site is located in a remote area such as an overseas factory, it takes time to check on the progress; and there has been room for improvement for efficient progress checking.

BRIEF DESCRIPTION OF THE DRAWINGS

FIG. 3 is a data structure diagram showing a relationship between first information and second information.

FIG. 4 is a diagram showing a structure of pieces of information associated with image information.

FIG. 8 is a diagram showing a first modification of the control table.

FIG. 9 is a diagram showing a second modification of the control table.

FIG. 11 is a diagram illustrating an input operation screen.

DETAILED DESCRIPTION

Figure 1:
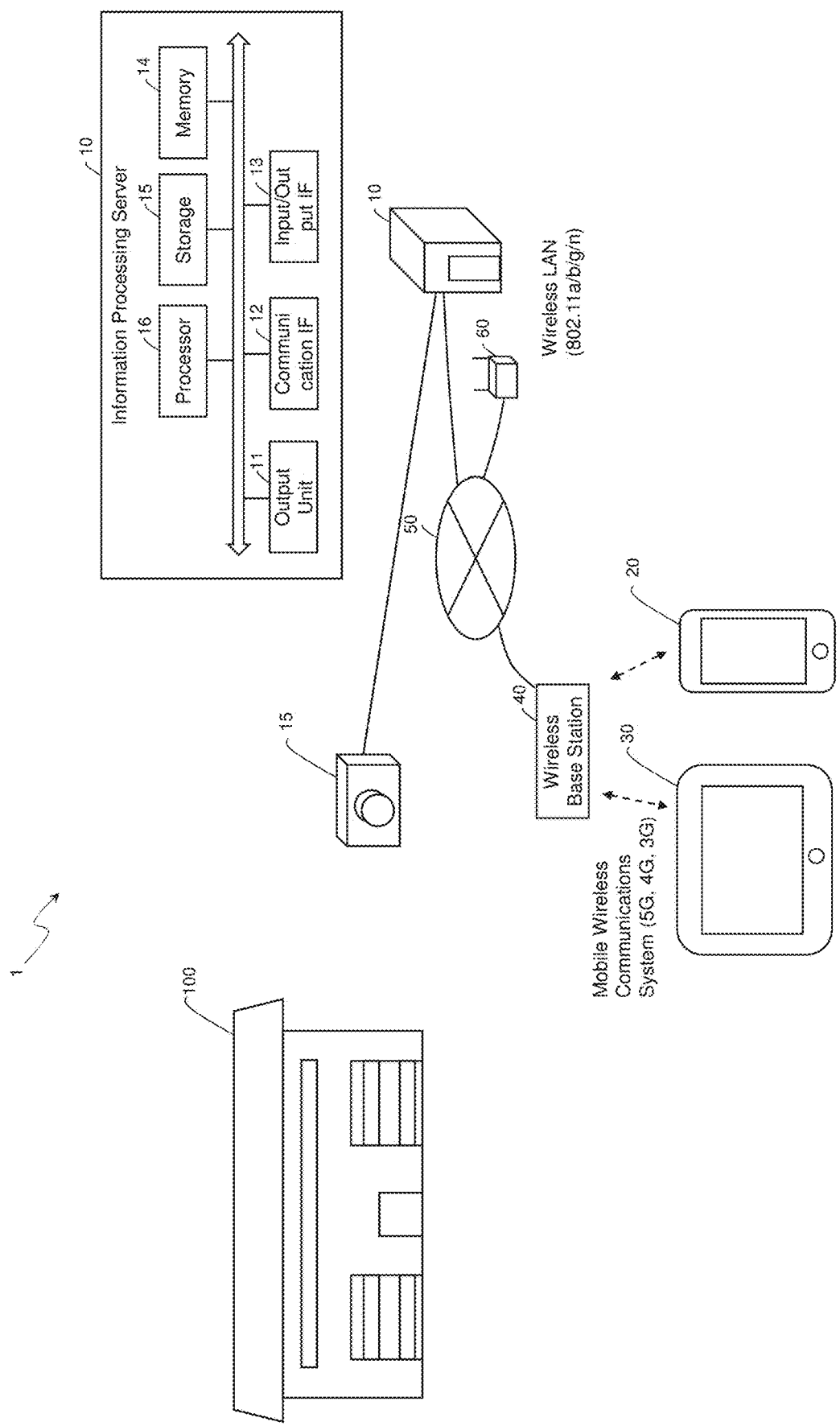
FIG. 1 is a diagram showing an overall configuration of a system.

Hereinafter, an embodiment of the present disclosure will be described in detail based on drawings. Note that in the drawings for explaining the embodiment, the same components are generally denoted by the same reference sign, and redundant descriptions thereof will be omitted.

One aspect of the present disclosure is a program for causing a processor of a computer to execute: a step of receiving an input of first information indicating a name of a component of a finished product to be manufactured at a manufacturing site; a step of receiving an input of second information indicating a name of a manufacturing process for the component; a step of receiving an input of image information captured by photographing or filming a state of the manufacturing process; a step of associating the image information with the first information and the second information; and a step of presenting the image information together with the first information and the second information to a user, wherein in the step of presenting the image information, the processor presents the image information in a form of a table with one of the first information and the second information taken as a row item and the other as a column item, the table includes a plurality of frames defined by a row heading in which either of the first information and the second information is put vertically and a column heading in which the other is put horizontally, and a plurality of images corresponding to the first information and the second information appearing in the frames.

The program of the present disclosure is capable of enhancing the efficiency of the progress checking.

FIG. 1 is a diagram showing an overall configuration of a system 1 according to the present embodiment.

As shown in FIG. 1, the system 1 is a system for controlling progress in a manufacturing process at a manufacturing site in a factory 100.

The system 1 can be used not only for controlling the progress in the manufacturing process but also for sharing the occurrence of trouble and a solution thereto as well as for passing on practical manufacturing techniques.

More specifically, the system 1 stores data captured by photographing or filming the manufacturing site (hereinafter referred to as image information) together with an attribute of the data (a photographing/filming date, a member name, a process name, a person who captured the data, and a person who saved the data) and user's comments on the image information so as to be shared with each user.

Examples of the user of the system 1 include persons who need to keep track of the situation at the manufacturing site, such as those in charge of controlling the progress in the manufacturing process at the manufacturing site, those in charge of operations, those in charge of the site, as well as designers of each component.

As shown in FIG. 1, the system 1 includes an information processing server 10. The information processing server 10 is used together with a camera 15 or an operating terminal 20 or 30 having a photographing or filming function.

The operating terminals 20 and 30 are connected to the information processing server 10 via a network 50.

In the illustrated example, a smartphone 20 and a tablet terminal 30 are used as the operating terminals. Note that the number of the smartphones 20 and tablet terminals 30 is not limited to the example shown in the figure; multiple smartphones 20 and multiple tablet terminals 30 may be used.

The smartphone 20 and the tablet terminal 30 are communicatively connected to each other via the network 50. The smartphone 20 and the tablet terminal 30 are communicatively connected to the information processing server 10 via the network 50.

A user account is registered with the information processing server 10. Data in the information processing server 10 can be viewed and edited when the user account is input. The user account includes a user ID for identifying a user and a password for authorizing access to the information processing server 10.

The system 1 can be operated by, for example, the smartphone 20 or the tablet terminal 30. The system 1 can be operated by, for example, a desktop personal computer (PC) or a laptop PC. As such, when a terminal without a photographing or filming function is used as the operating terminal, image information captured by the camera 15 such as a digital camera can be separately input to the operating terminal.

As shown in FIG. 1, the information processing server 10 includes an output unit 11, a communication interface (IF) 12, an input/output interface (IF) 13, a memory 14, a storage 15, and a processor 16.

The information processing server 10 communicates with communications equipment such as a wireless base station 40 that is compliant with communication standards such as 5G, 4G, and Long-Term Evolution (LTE), and a wireless LAN 60 that is compliant with wireless local area network (LAN) standards such as Institute of Electrical and Electronics Engineers (IEEE) 802.11, whereby the information processing server 10 is connected to the network 50.

The output unit 11 outputs information on a display of the smartphone 20 or tablet terminal 30 to present it to the user.

The communication IF 12 is an interface for inputting or outputting a signal for the information processing server 10 to communicate with the smartphone 20 or the tablet terminal 30.

The input/output IF 13 includes an input device and an output device.

The input device is an input device for receiving an input operation (e.g., a pointing device such as a touch panel, a touchpad, and a mouse, a keyboard, etc.). The output device is an output device for presenting information that excludes a display; examples of the output device include a speaker. The input operation may be performed using the input device instead of the operating terminal such as the smartphone 20 and the tablet terminal 30.

Figure 2:
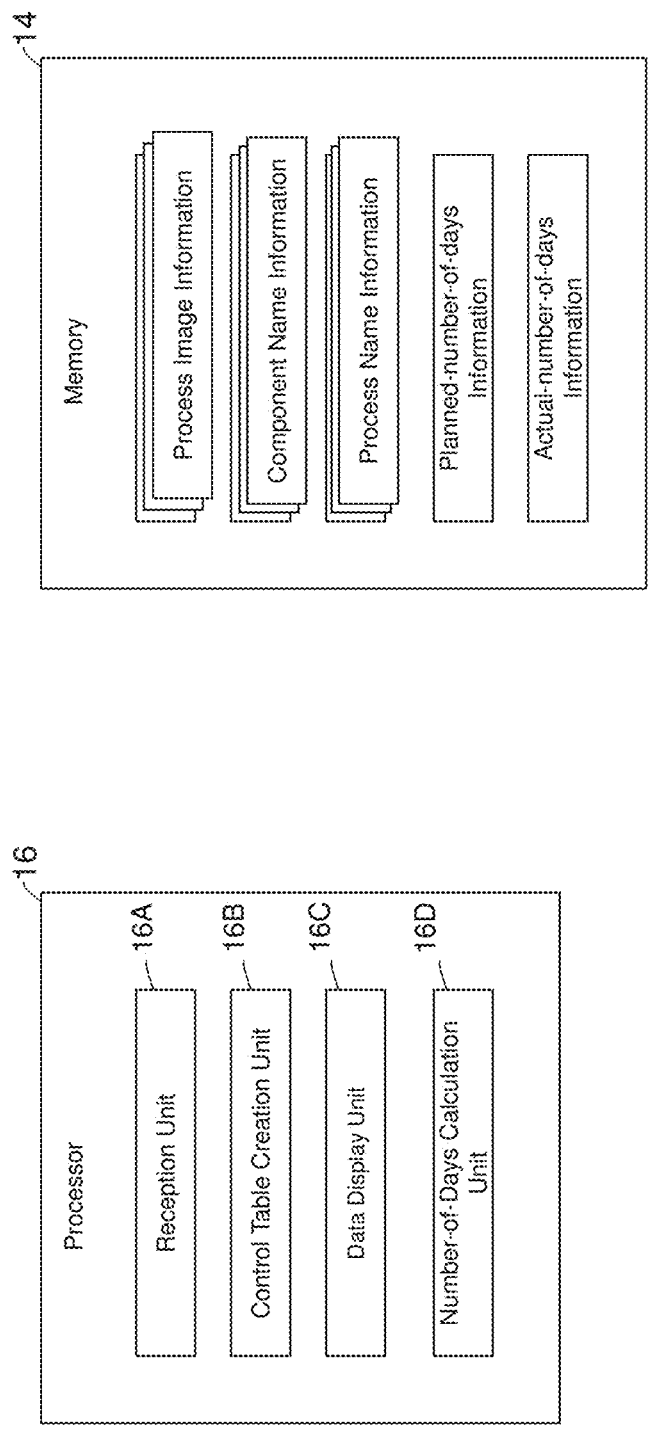
FIG. 2 is a diagram showing a processor configuration and a memory configuration.

The memory 14 is a memory for temporarily storing a program and data to be processed by the program or the like, and is, for example, a volatile memory such as a dynamic random access memory (DRAM). The memory 14 stores image information. FIG. 2 is a diagram showing configurations of the processor 16 and the memory 14. As shown in FIG. 2, the memory 14 stores not only the image information but also first information, second information, information on a planned number of days, and information on an actual number of days.

As shown in FIG. 1, the storage 15 is a storage device for saving data, such as a flash memory and a hard disc drive (HDD). The storage 15 stores various programs to be executed by the processor 16. When the processor 16 executes these programs, various steps in the system 1 described later are executed.

The processor 16 is hardware for executing an instruction set described in a program and includes an arithmetic logic unit, a register, and a peripheral circuit.

A functional configuration of the processor 16 will be described.

As shown in FIG. 2, the processor 16 executes programs stored in the storage 15, thereby fulfilling functions of a reception unit 16A, a control table creation unit 16B, a data display unit 16C, and a number-of-days calculation unit 16D.

The reception unit 16A receives an input of the first information. The first information is information indicating a name of a component of a finished product to be manufactured at the manufacturing site.

The term "component" as used herein refers to an intermediate product, which is a material that is processed at least one time at the manufacturing site so as to serve as a part of the finished product in a subsequent process. For example, when a boiler is the finished product, the component refers to an element (intermediate product), namely, a constituent of the boiler that is processed at least one time. That is, a member that is ready to be used at the time of arrival without the need of any process, such as a fastening member for connecting elements, does not correspond to the component as used herein. When a boiler is the finished product, examples of the component name include a combustion chamber, a burner, a water pipe, a smoke pipe, and a heat insulator. In the following description, component 1, component 2, etc. are used as the component name.

The reception unit 16A receives an input of the second information. The second information is information indicating a name of a manufacturing process for the component. Examples of the process name include material arrival, component cutting, assembly, and welding. As the process name, a name of any process required of the component can be input.

In addition, the second information may include an assembly configuration in which components are assembled to form the finished product.

FIG. 3 is a data structure diagram showing a relationship between the first information and the second information. As shown in FIG. 3, the process name, which is the second information, is set for each component name, which is the first information. That is, since different components require different manufacturing processes, a required process is set and input for each component.

The reception unit 16A receives an input of the image information. The image information is captured by photographing or filming the state of the manufacturing process. The image information may include meta data such as a photographing/filming date, a photographing/filming terminal, information on a person who photographed or filmed, information on a person who saved the captured image information, and data capacity, as supplementary information.

Figure 5:
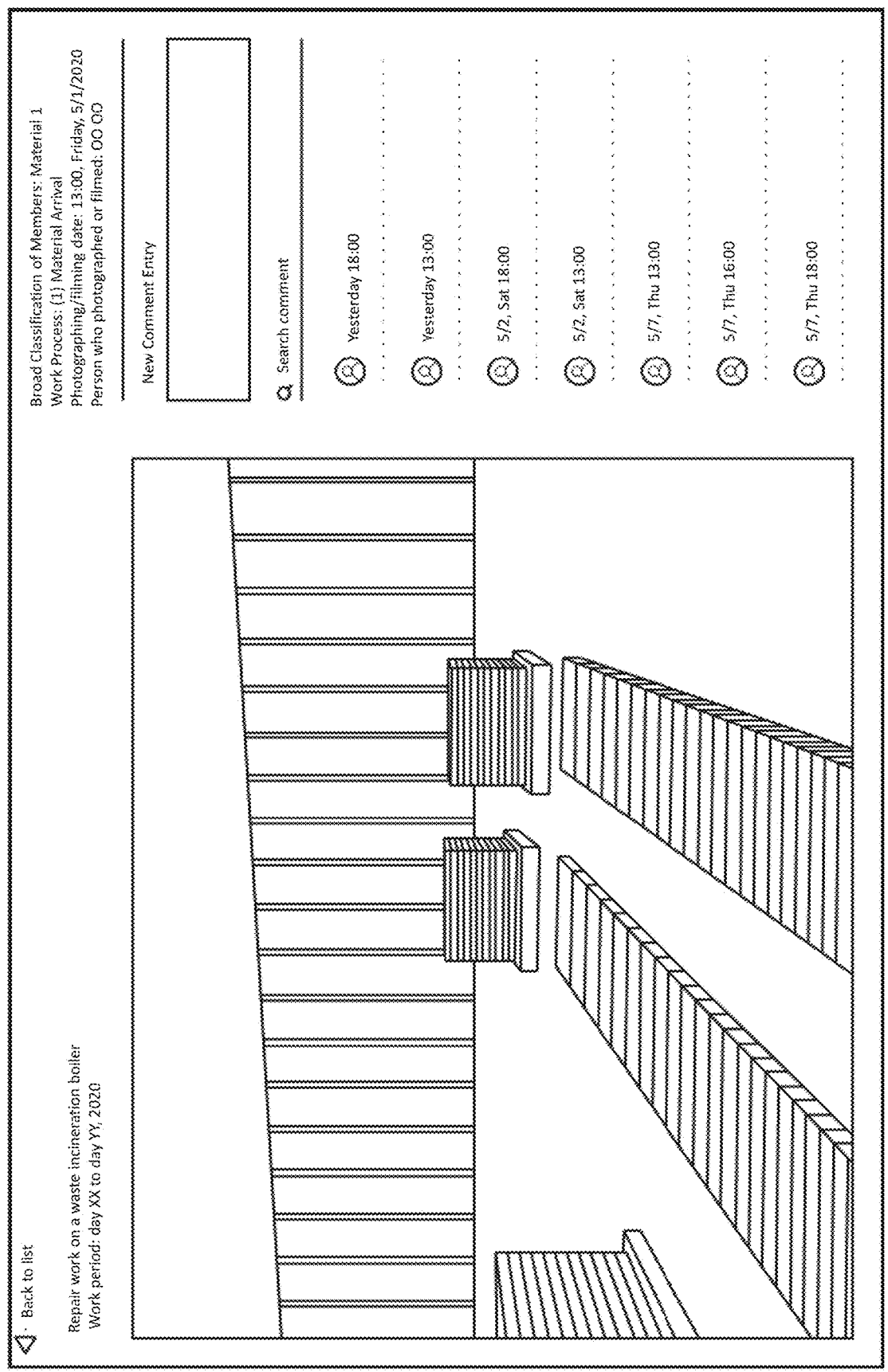
FIG. 5 is a diagram illustrating image information and comment information.

The image information stored is associated with comment information. The comment information is information on matters that a user who has viewed the image information should heed with respect to the captured image. FIG. 5 is a diagram illustrating the image information and comment information.

As shown in FIG. 5, information input by a user in a comment field at the upper right of the image information is posted as the comment information at the lower right under the comment information. The reception unit 16A receives the comment information that is input by the user operating the input device or the operating terminal 20 or 30.

The first information, the second information, the information on the photographing/filming date, and the information on a person who photographed or filmed are listed at the upper right of the image information. Note that information on a person who saved the image may be listed together with the information on the person who photographed or filmed. The information on the person who saved the image information refers to a person who saved captured image data as a picture in the system 1.

The reception unit 16A associates the input image information with the first information and the second information. FIG. 4 is a diagram showing a structure of information associated with image information.

As shown in FIG. 4, the image information is associated with the first information and the second information. That is, each piece of the image information stored is associated with information on a process and a component for which the image information has been captured. Note that multiple pieces of the image information may be stored for one process for one component.

The association of pieces of information is performed in response to a user's operation. More specifically, a user registers new image information and then selects a component name and the second information that are already input, whereby the first information and the second information are associated with the image information.

In addition, for example, multiple pieces of image information that have been captured by the camera 15 may be dragged and dropped toward a predetermined frame in a control table described later, whereby the first information and the second information are selected.

Also, for example, the first information and the second information may be selected in advance before the operating terminal 20 or 30 captures an image of a process such that the first information and the second information can be associated with image information acquired afterward.

Further, for example, the first information and the second information may be designated, by operating the input device, for the image information that is input to the reception unit 16A after the operating terminal 20 or 30 captures an image of a process, whereby the first information and the second information are selected.

Moreover, for example, the first information and the second information may be designated, by operating the operating terminal 20 or 30, in advance for the image information prior to be input to the reception unit 16A after the operating terminal 20 or 30 captures an image of a process, whereby the first information and the second information are selected.

Note that the association of pieces of information may be performed not through a user's operation but through automatic discrimination by the reception unit 16A.

In this case, for example, from the position information for the smartphone 20 used to acquire the image information, the position where the photographing or filming has been performed may be identified and the corresponding component name and process name may be determined. For example, new image information may be subjected to image analysis using similar past image information to determine a component name and process name.

Figure 6:
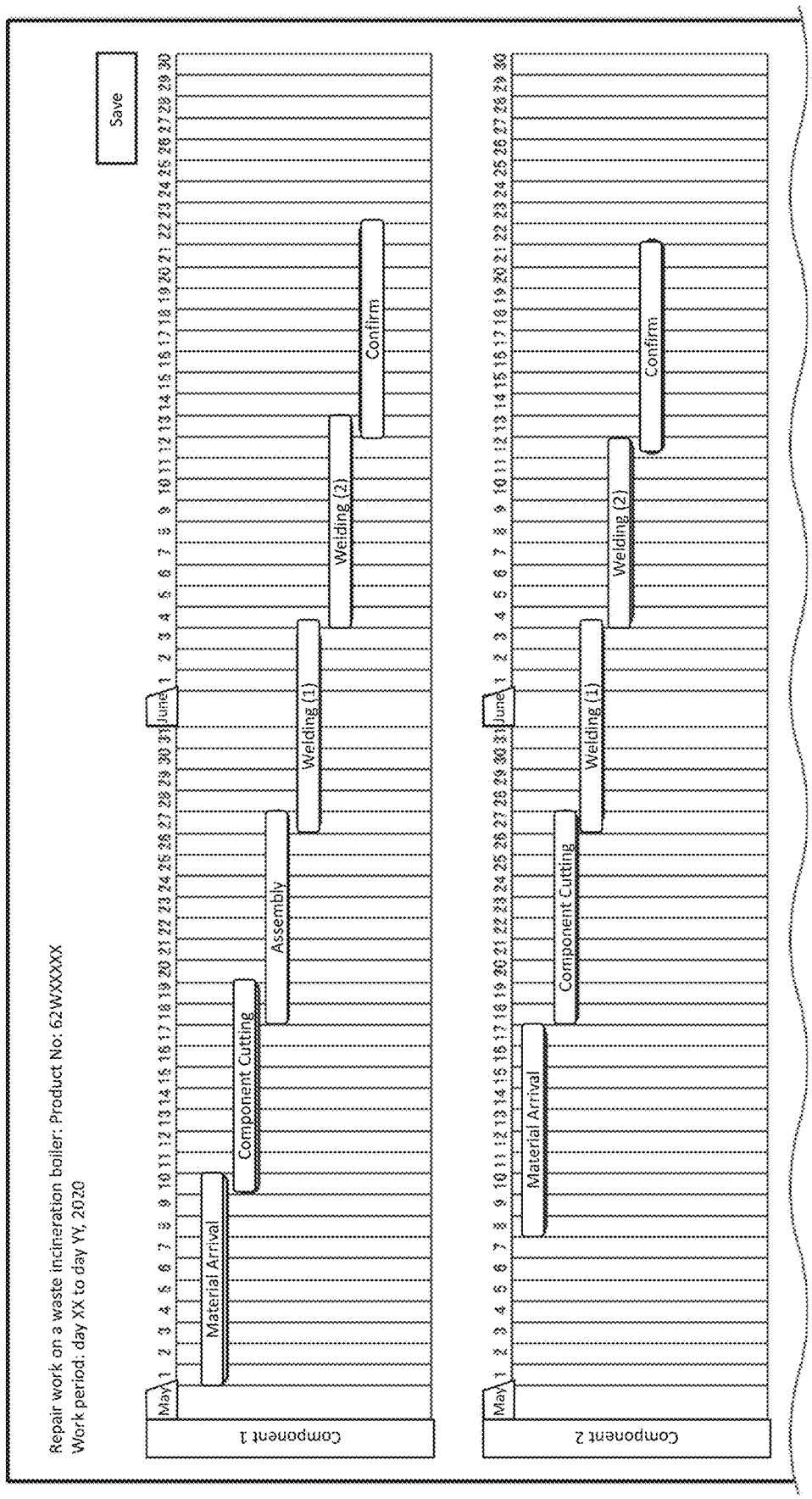
FIG. 6 is a diagram illustrating an example of schedule information.

The reception unit 16A receives an input of schedule information indicating a manufacturing schedule for each manufacturing process for a component. The schedule information is input to the reception unit 16A when the user inputs a predetermined manufacturing schedule for each component and a schedule related to assembly of components through the input device or the operating terminal. FIG. 6 is a diagram illustrating an example of the schedule information.

As shown in FIG. 6, a schedule for each manufacturing process is set in advance for each component. The user inputs this information to the information processing server 10 using the input device or the operating terminal.

The schedule information is input by setting a planned start date and a planned end date for each process for each component. In the example shown in FIG. 6, the arrival of material for the component 1 is planned to start on May 1 and end on May 10. In inputting the schedule information, the planned start date and the planned end date are set for every process for every component.

The system 1 of the present disclosure presents the image information together with the first information and the second information to the user. A function of the system will be described.

Figure 7:
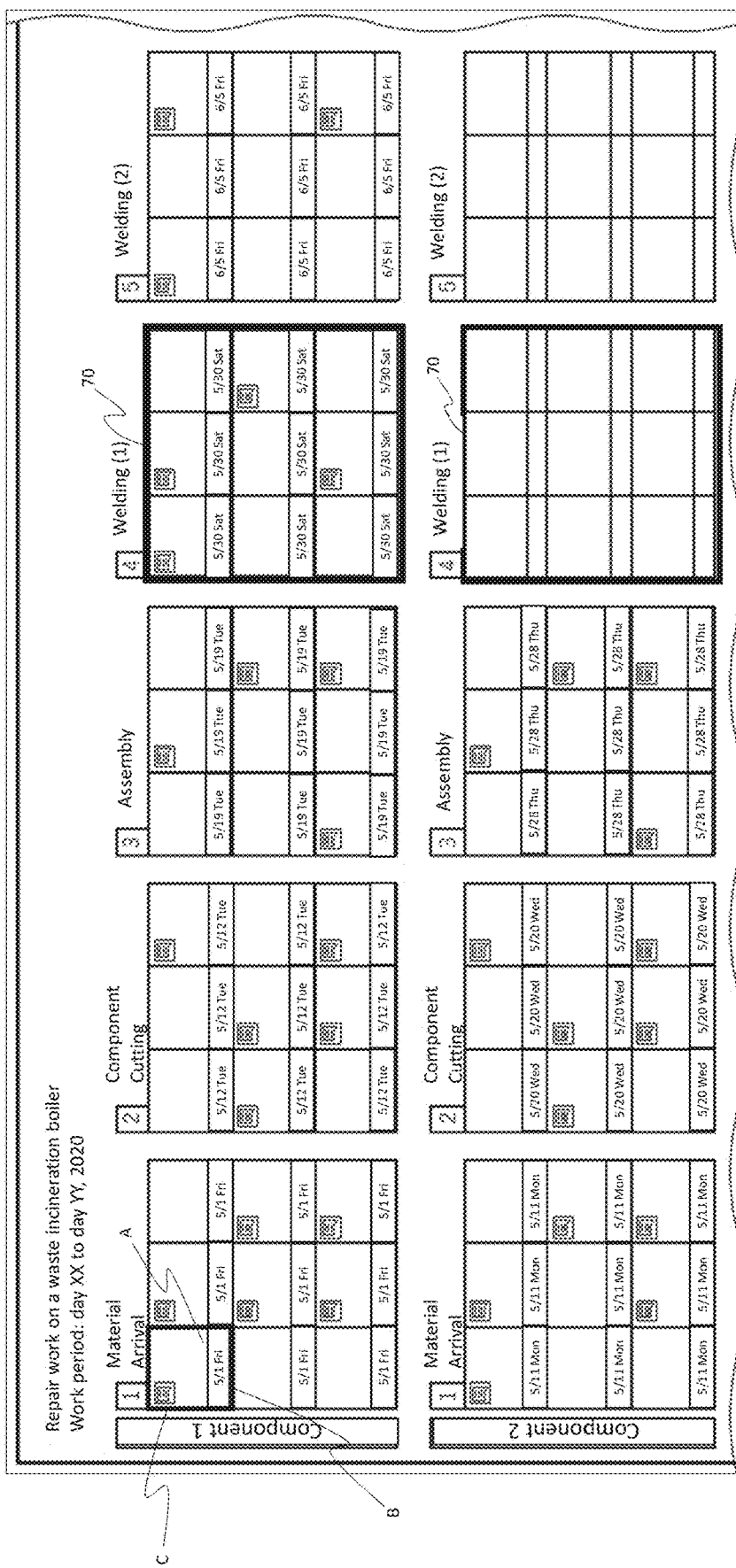
FIG. 7 is a diagram showing a control table.

The control table creation unit 16B creates a control table in which the first information and the second information are taken as control items. The control table includes the first information as a row item, i.e., a row heading, and the second information as a column item, i.e., a column heading. Then, the data display unit 16C displays the image information as data to be controlled in the control table, i.e., as a table body. FIG. 7 is a diagram showing a control table.

As shown in FIG. 7, the control table has component names arranged vertically as the row heading at the left end, and process names arranged horizontally as the column heading at the upper end of their respective frames. Each frame has reduced images of the image information arranged. Here, a frame located at the upper left end will be described.

Each frame in the illustrated example has nine pictures appearing in the order of photographing/filming date. When you scroll down with a mouse icon on the frame, the other pictures will appear in sequence. When any one of the pictures is selected (reference sign A as shown), an image picture for the corresponding process will appear on the screen (see FIG. 5). Note that the number of images appearing in each frame can be changed optionally.

In response to an operation of viewing the image information, the system 1 of the present disclosure highlights the second information indicating a manufacturing process that should be in progress at the time of the viewing operation, on the basis of the schedule information. This function will be described.

The control table creation unit 16B provides an indicator 70 having a function of highlighting the second information on the control table. The indicator 70 is an indicator that is provided for a frame of the control table that corresponds to a process name (the second information) that should be in progress according to the schedule information, in response to a user's operation in viewing the control table. In the illustrated example, the indicator 70 is rectangle.

The data display unit 16C displays the control table with the indicator 70 appearing on the table body. More specifically, as shown in FIG. 6, the process of welding (1) for the component 1 spans from May 27 to June 3. When the image information is viewed on, for example, June 1, the indicator 70 is provided for a frame corresponding to the process of welding (1) for each of the components 1 and 2 as shown in FIG. 7.

Here, as the image information is saved with the frame for the welding (1) of the component 1, it can be confirmed that the work is proceeding approximately as planned. On the other hand, as no image information is staved with the frame for the welding (1) of the component 2, which is planned to start on May 27, it can be confirmed that there is a delay in the assembly of the component 2.

When displaying the image information, the data display unit 16C displays information on a photographing/filming date that the image information has as a metafile, together with the image information. In the example of FIG. 7, the photographing/filming date is provided on a lower part B of each image information.

At an upper left part of each image information, a comment indicator C indicating the presence or absence of comment information appears. For the image information having the comment indicator C appearing, the comment information is saved.

Based on photographing/filming date information on a photographing/filming date of the image information corresponding to a manufacturing process, the number-of-days calculation unit 16D calculates an actual number of days required for this manufacturing process. More specifically, the number-of-days calculation unit 16D takes a period between the earliest photographing/filming date and the latest photographing/filming date among a group of pieces of the image information corresponding to the second information, as the actual number of days required for the process.

The number-of-days calculation unit 16D calculates a planned number of days for the manufacturing process defined in the schedule information. More specifically, the number-of-days calculation unit 16D takes a period that has been set for a process in the schedule information as a planned number of days for this process.

Then, the data display unit 16C displays the actual number of days together with the planned number of days.

Figure 8:
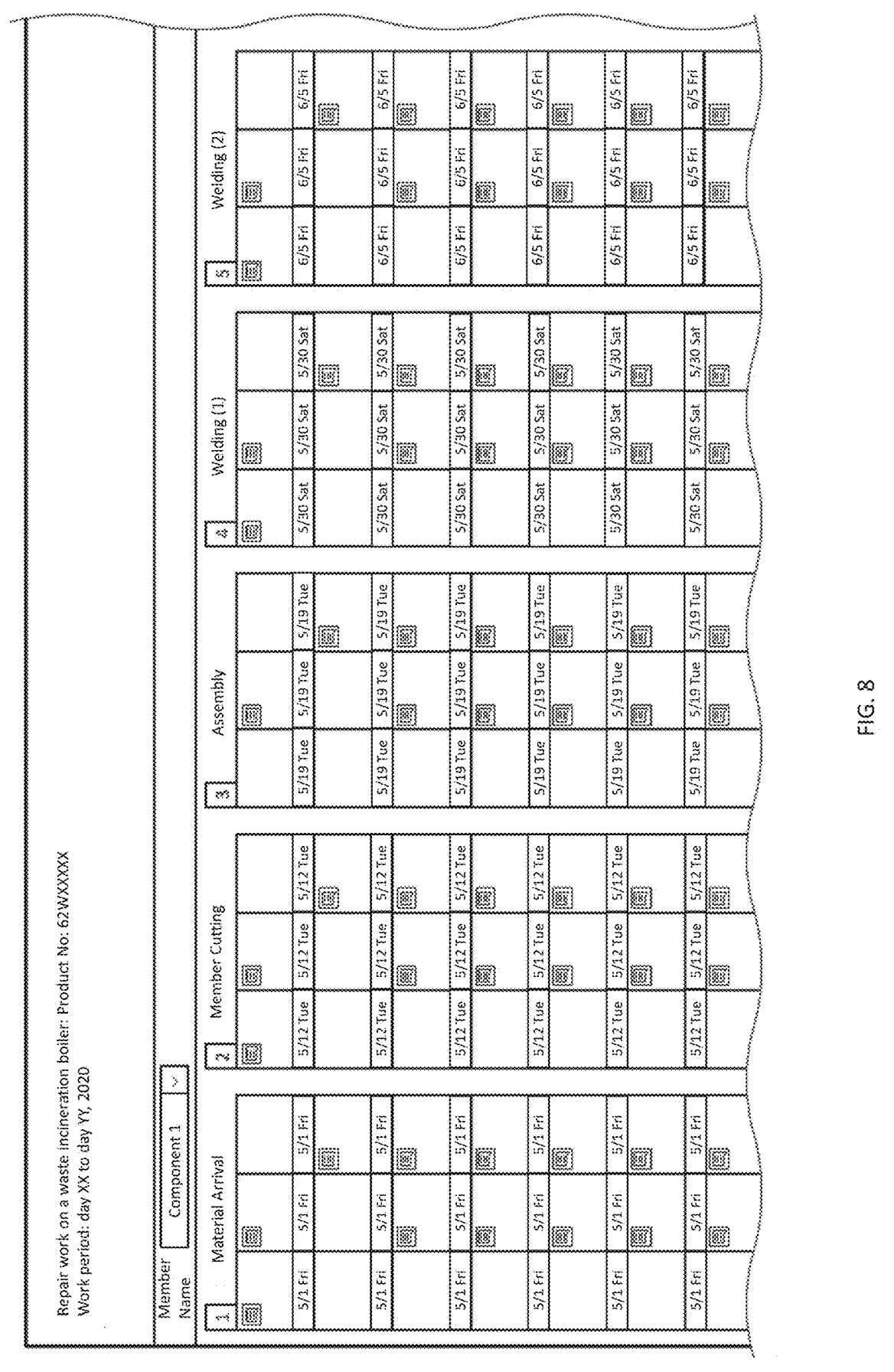
Figure 9:
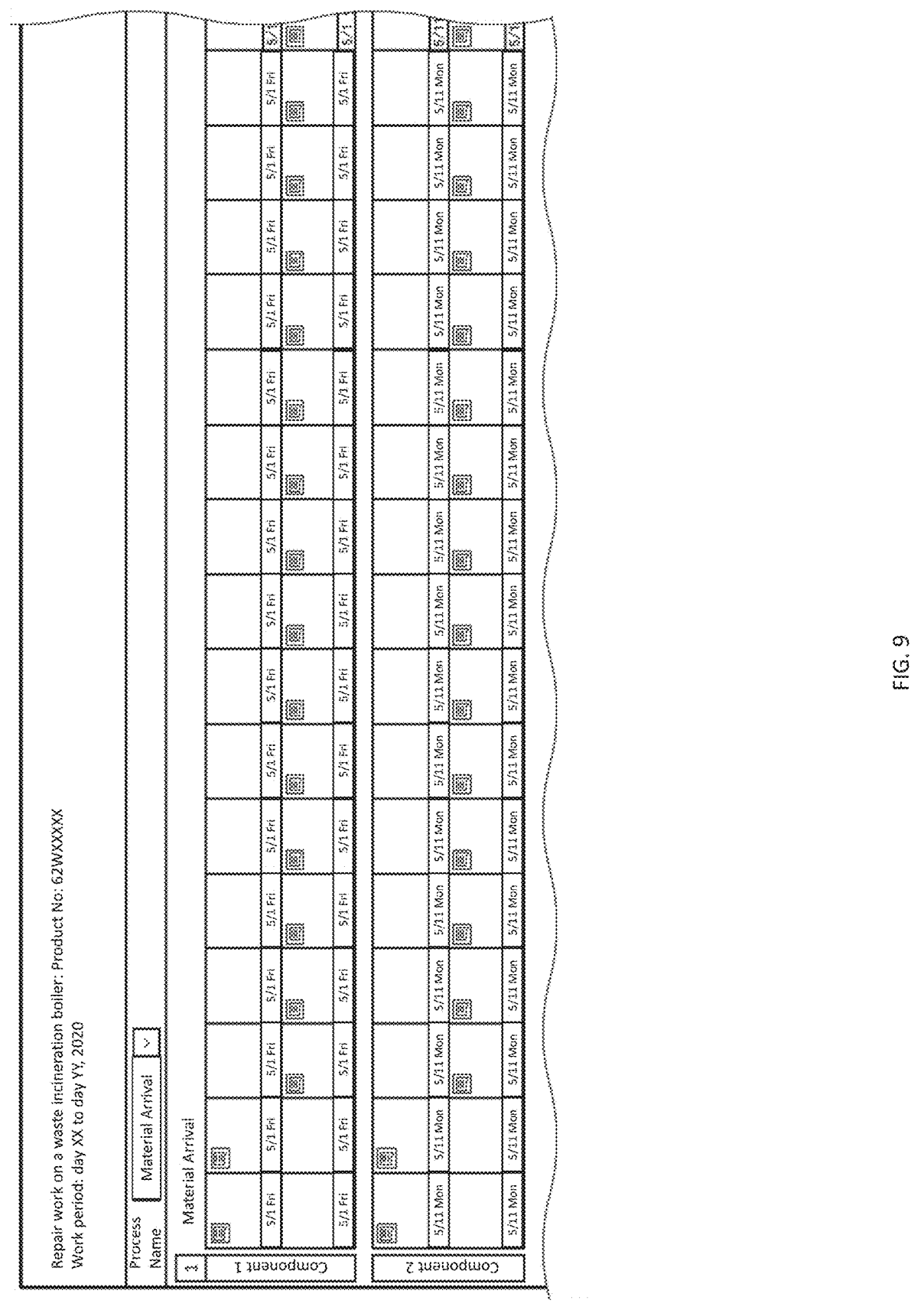

In addition, the data display unit 16C is capable of changing the manner in which the control table is displayed. FIG. 8 is a diagram showing a first modification of the control table. FIG. 9 is a diagram showing a second modification of the control table.

As shown in FIG. 8, the data display unit 16C is capable of displaying a time-line list of pieces of the image information corresponding to the first information that has been selected. In the illustrated example, the component 1 is selected as the component. In this case, pieces of the image information related to each process for the component 1 appear in a time series.

As shown in FIG. 9, the data display unit 16C is capable of displaying a time-line list of pieces of the image information corresponding to the second information that has been selected. In the illustrated example, material arrival is selected as the process. In this case, pieces of the image information related to the material arrival for each component appear in a time series.

<First Example of Processing of System 1>

Figure 10:
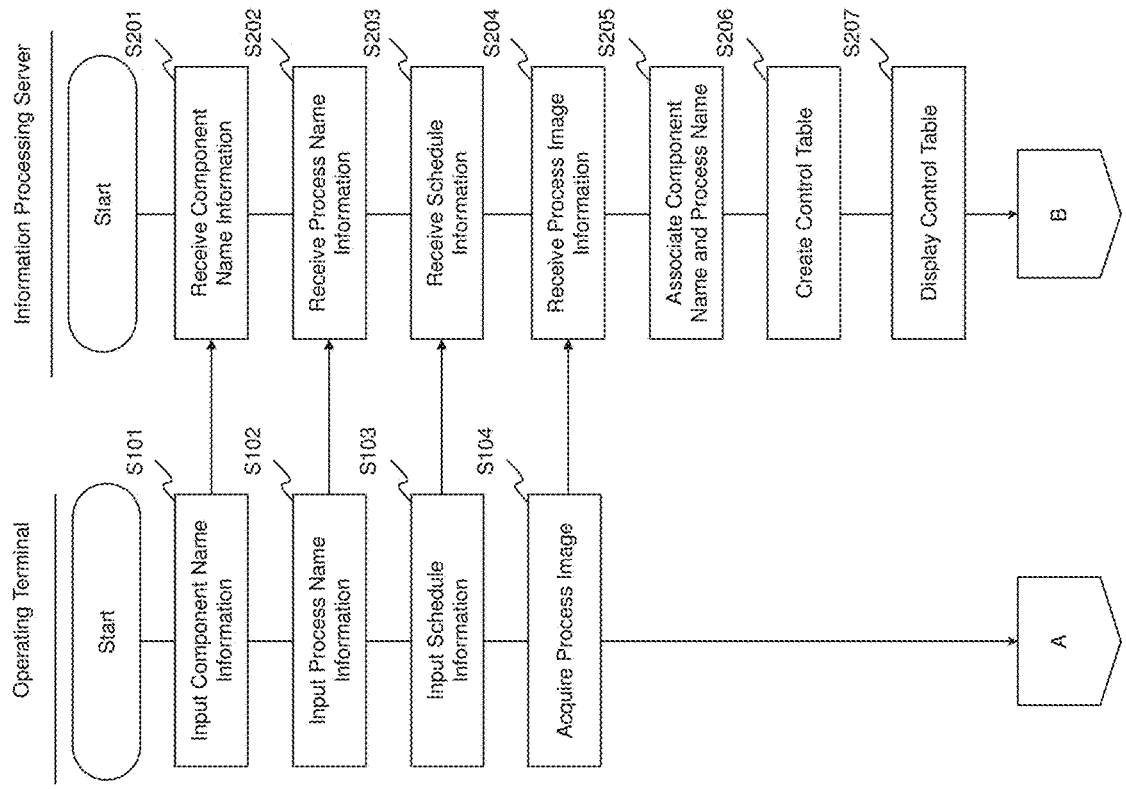
FIG. 10 is a diagram illustrating the first half of a processing flow in the system.
Figure 12:
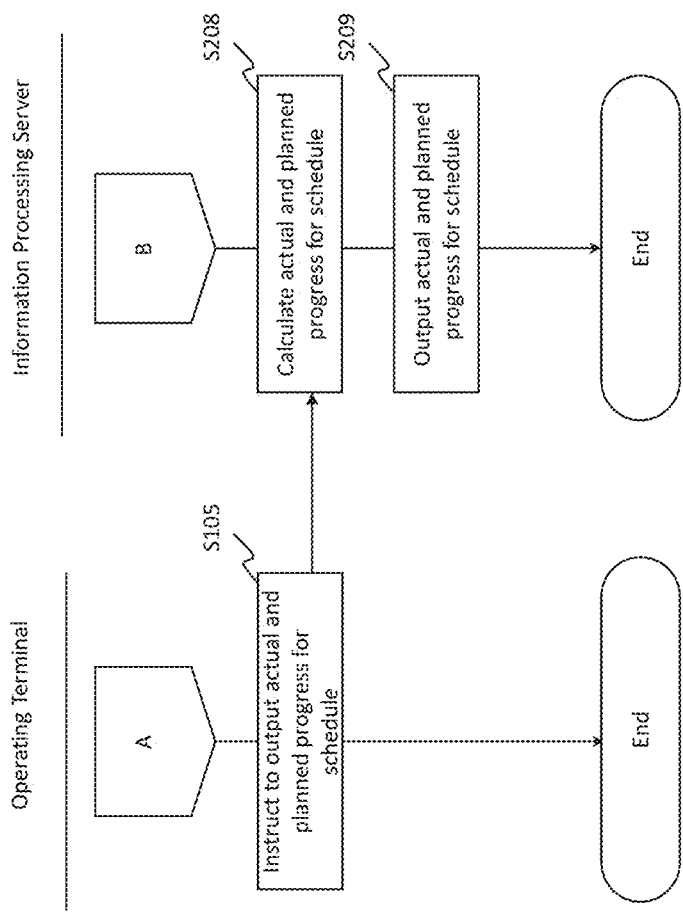
FIG. 12 is a diagram illustrating the second half of a processing flow in the system.

Next, processing of the system 1 will be described. FIG. 10 is a diagram illustrating the first half of a processing flow in the system 1. FIG. 11 is a diagram illustrating an input operation screen. FIG. 12 is a diagram illustrating the second half of the processing flow in the system.

As shown in FIG. 10, the user operates the input device or the operating terminal to input the first information (S101). At this time, the user performs an initial setting such as a construction name and user's registration at the same time.

The first information that has been input in step S101 is received by the reception unit 16A of the processor (S201).

After step S201, the user operates the input device or the operating terminal to input the second information (S102). The second information that has been input in step S102 is received by the reception unit 16A (S202). FIG. 11 shows a screen resulting from the input operation so far.

As shown in FIG. 11, process names are set and input for each component name. The number of processes varies depending on the components and thus may vary from component to component. Any number of fields for inputting component names and process names can be added.

After step S202, the user inputs the schedule information by operating the input device or the operating terminal (S103). The schedule information that has been input in step S103 is received by the reception unit 16A (S203).

After step S203, the user acquires an image of a process by operating a camera of the input device or operating terminal (S104). After step S104, the reception unit 16A receives the image information (S204).

After step S204, the reception unit 16A associates the image information with the component name and the process name (S205).

After step S205, the control table creation unit 16B creates a control table (S206).

After step S206, the data display unit 16C displays the control table (S207). At this time, the data display unit 16C displays the indicator 70 on the control table. Based on the date on which the user is viewing the control table and dates of pieces of the image information, the indicator 70 appears so as to surround a frame that has image information captured on a corresponding date saved. Note that the indicator 70 does not need to be rectangle, and the manner in which the indicator 70 appears can be changed optionally. For example, the indicator 70 may be shown in a circular or linear shape or may be shown as a symbol such as an arrow.

Next, as shown in FIG. 12, the user provides an instruction to display actual progress and planned progress for the schedule using the input device or the operating terminal (S105). After step S105, the number-of-days calculation unit 16D calculates the actual progress and planned progress for the schedule (S208).

After step S208, the data display unit 16C outputs the planned number of days for the schedule and the actual number of days required for the work (S209).

As described above, the present disclosure systematically displays the image information captured by photographing or filming the state of the manufacturing process for the component as data to be controlled in the control table having the first information and the second information as items.

This enables a person in charge of a delivery time to immediately track the progress of each process for each component by seeing the image information appearing in the control table.

Then, this can eliminate, for example, the need for this person in charge to visit the site to check on the progress, which can enhance the efficiency of progress checking.

In addition, by sharing the control table with people involved, the progress can be reviewed at a glance and shared smoothly among these people.

In addition, for example, when the image information is used for a designer or the like who fails to have much knowledge of an actual process at the manufacturing site to learn how the process goes, the control table can play a role in passing on techniques.

In addition, since pieces of the image information for the manufacturing site are sorted according to component names and process names, a designer who has never seen the manufacturing site can see a track record of the manufacturing with the system 1. This allows a smooth grasp of the manufacturing process at the manufacturing site.

The system 1 provides the process name in the control table with the indicator 70 indicating the control table as being viewed. Accordingly, by checking whether image information corresponding to the process name provided with the indicator 70 is saved, it can be easily checked whether the schedule is proceeding as planned. This can further enhance the efficiency of progress checking.

In addition, the system 1 displays the actual number of days required for the manufacturing process together with the planned number of days for the manufacturing process, which is registered in advance. This can make it easy to check the actual and planned progress, such as how far behind schedule the process is.

This also makes it possible to accurately grasp the capacity at the manufacturing site, which has been difficult to grasp, for each component and for each process and accumulate it as a database.

In addition, the control table creation unit 16B creates the control table with the first information taken as a row item and the second information taken as a column item. This allows the control table to have component names arranged vertically and process names arranged horizontally, and to be reviewed at a glance accordingly.

In addition, the data display unit 16C displays the photographing/filming date of the image information together with the image information. This can make it easy to check a date on which an image of a process was acquired.

The data display unit 16C also displays the time-line list of the pieces of the image information corresponding to the first information that has been selected. This attains convenience in checking on the progress in the manufacturing process for a certain component.

The data display unit 16C also displays the time-line list of the pieces of the image information corresponding to the second information that has been selected. This attains convenience in checking on the condition of each component related to a certain process.

<Modifications>

Next, modifications will be described.

The above embodiment shows, but is not limited to, an example in which the program is used at the manufacturing site in the manufacturing factory 100. The program may be used outdoors, for example, on a building site. In such a case, construction name information indicating kinds of construction may be adopted instead of the first information.

The process flow in the above-described embodiment can be changed within a consistent range. For example, the second information may be input prior to the first information, and an image of a process may be acquired first.

The above-described embodiment shows, but is not limited to, a configuration in which the control table is created with the first information taken as a row item, i.e., a row heading, and the second information taken as a column item, i.e., a column heading. The control table may be created with the first information taken as a column item, i.e., a column heading, and the second information taken as a row item, i.e., a row heading.

The above-described embodiment shows, but is not limited to, a configuration in which the indicator 70 highlights the second information indicating the manufacturing process that should be in progress at the time of viewing.

For example, the second information of interest may be highlighted without using the indicator 70 in such a manner that this second information is brightened. Image information included in a frame corresponding to the second information of interest may be brightened. Such image information may be highlighted in such a manner that the corresponding second information flashes on and off.

Although a preferred embodiment of the present disclosure has been described above, the present disclosure is not limited to such a specific embodiment but includes the inventions recited in the claims and equivalents thereof.

In addition, the configurations of the devices described in the above embodiment and modifications can be combined as appropriate, as long as no technical contradiction arises.

The invention claimed is:

1. A system comprising a processor and a memory, the processor being configured to:
   receive an input of first information indicating a name of a component of a finished product to be manufactured at a manufacturing site;
   receive an input of second information indicating a name of a manufacturing process for the component;
   receive an input of image information captured by photographing or filming a state of the manufacturing process;
   associate the image information with the first information and the second information; and
   present the image information together with the first information and the second information to a user,
   wherein in presenting the image information,
   the processor is configured to present the image information in a form of a table with either of the first information and the second information taken as a row item and the other as a column item,
   the table includes a plurality of frames partitioned by a row heading in which either of the first information and the second information is put vertically and a column heading in which the other is put horizontally, and
   a plurality of images corresponding to the first information and the second information appears in the frames.

2. The system according to claim 1, wherein the processor is configured to:
   receive a scrolling operation on the frame from the user; and
   display other image information corresponding to the frame in sequence according to the scrolling operation.

3. The system according to claim 1, wherein the processor is configured to:
   receive an input of schedule information indicating a manufacturing schedule for the manufacturing process for the component, and
   highlight the second information indicating the manufacturing process that should be in progress at a time of an operation of viewing the image information, based on the schedule information, in response to the operation of viewing the image information.

4. The system according to claim 3, wherein in highlighting the second information,
   the processor provides an indicator for the frame corresponding to the second information in the table, thereby highlighting the second information.

5. The system according to claim 1, wherein the processor is configured to:
   receive an input of schedule information indicating a manufacturing schedule for the manufacturing process for the component, and
   calculate an actual number of days required for the manufacturing process based on photographing/filming date information on a photographing/filming date of the image information corresponding to the manufacturing process;
   calculate a planned number of days for the manufacturing process defined in the schedule information; and
   present the actual number of days together with the planned number of days to the user.

6. The system according to claim 1, wherein in presenting the image information, the processor is configured to display a photographing/filming date of the image information together with the image information.

7. The system according to claim 1, wherein the processor is configured to:
   display a time-line list of pieces of the image information corresponding to the first information that is selected.

8. The system according to claim 1, wherein the processor is configured to:
  display a time-line list of pieces of the image information corresponding to the second information that is selected.

9. The system according to claim 1, wherein in associating the image information,
  the processor associates the image information with the first information and the second information in response to a user's operation.

10. The system according to claim 1, wherein the component is an intermediate product that is a material which is processed at least one time at the manufacturing site so as to serve as a part of the finished product in a subsequent process.

11. A method for causing a computer to execute:
  a step of receiving an input of first information indicating a name of a component of a finished product to be manufactured at a manufacturing site;
  a step of receiving an input of second information indicating a name of a manufacturing process for the component;
  a step of receiving an input of image information captured by photographing or filming a state of the manufacturing process;
  a step of associating the image information with the first information and the second information; and
  a step of presenting the image information together with the first information and the second information to a user,
  wherein in the step of presenting the image information,
  the processor presents the image information in a form of a table with the first information and the second information taken as a row item and a column item,
  the table includes a plurality of frames partitioned by a row heading in which either of the first information and the second information is put vertically and a column heading in which the other is put horizontally, and
  a plurality of images corresponding to the first information and the second information appears in the frames.

12. A non-transitory computer-readable storage medium storing a program for causing a computer to execute processing comprising:
  receiving an input of first information indicating a name of a component of a finished product to be manufactured at a manufacturing site;
  receiving an input of second information indicating a name of a manufacturing process for the component;
  receiving an input of image information captured by photographing or filming a state of the manufacturing process;
  associating the image information with the first information and the second information; and
  presenting the image information together with the first information and the second information to a user,
  wherein in presenting the image information,
  the program causes the computer to present the image information in a form of a table with the first information and the second information taken as a row item and a column item,
  the table includes a plurality of frames partitioned by a row heading in which either of the first information and the second information is put vertically and a column heading in which the other is put horizontally, and
  a plurality of images corresponding to the first information and the second information appears in the frames.

* * * * *